Aug. 19, 1941.  I. FELDMAN  2,253,230
SAFETY INNER TUBE FOR PNEUMATIC TIRES
Filed March 7, 1940
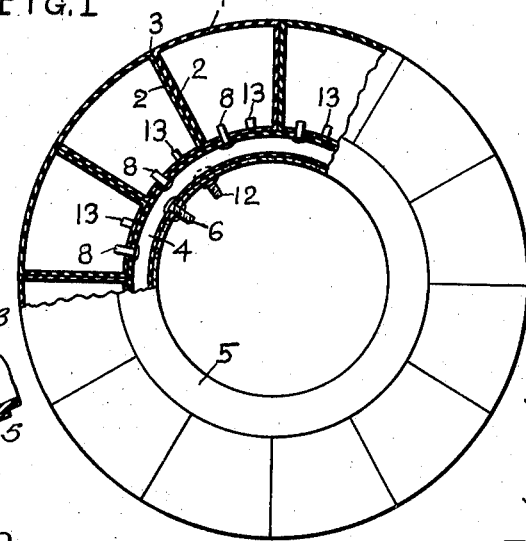
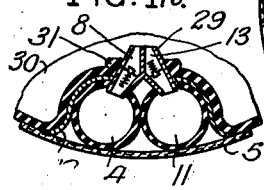
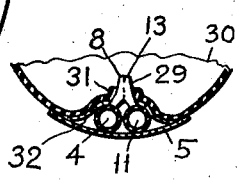
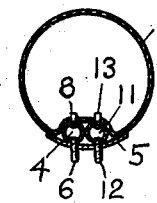
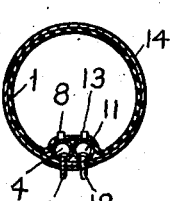
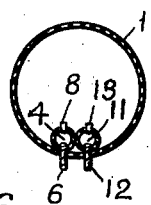
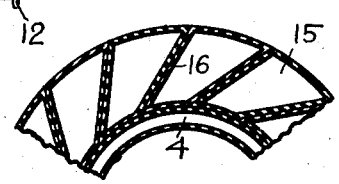
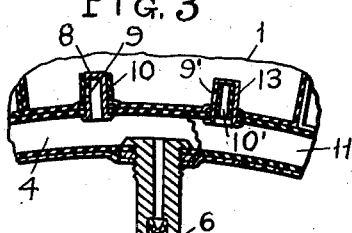
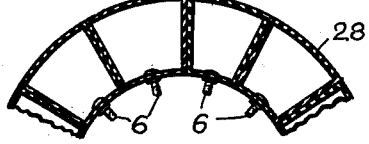
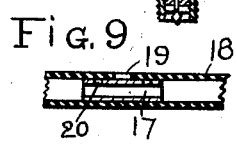
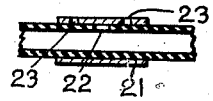
ISAIAH FELDMAN
INVENTOR.
BY John P. Mironow
ATTORNEY.

Patented Aug. 19, 1941

2,253,230

UNITED STATES PATENT OFFICE 2,253,230

SAFETY INNER TUBE FOR PNEUMATIC TIRES

Isaiah Feldman, Brooklyn, N. Y.

Application March 7, 1940, Serial No. 322,647

3 Claims. (Cl. 152—338)

My invention relates to safety inner tubes for pneumatic tires and has particular reference to multicellular tubes.

Ordinary pneumatic tires for automobiles and other similar vehicles, consisting of inner tubes and outer casings, have a disadvantage in that they become fully deflated all around if punctured in one place so that serious accidents may result if such a puncture occurs when a vehicle travels at a more or less high speed or is rounding a curve.

My invention has for its object to eliminate the danger of such a sudden deflation of a tire if it is punctured, for which purpose I provide an inner tube consisting of a plurality of individually inflatable elements or cells, all such cells being joined together to form an inner tube which can be placed into an ordinary tire casing.

Another object of my invention is to provide means to simultaneously inflate all the individual cells in my tube. I provide for this purpose an auxiliary tube or manifold of a relatively small diameter passing at the base of the cells or at the inner periphery of the tube, every cell being connected to the manifold by a one-way valve for admitting compressed air from the manifold into the cell. The manifold is provided with an ordinary tire valve for connecting it to a source of compressed air.

Another object of my invention is to provide means to deflate the tire by deflating all the individual cells if it is desired, for instance, to mount the tube with the tire on a wheel or to remove it from the wheel. I provide for this purpose a second auxiliary tube or manifold extending alongside the inflating manifold and connected with every cell by one-way valves adapted to admit the air from the cells into the deflating manifold.

The deflating manifold is provided with an ordinary tire valve which can be manually opened for releasing the air from the manifold, and, consequently, from the cells.

My invention is more fully described in the accompanying specification and drawing in which—

Fig. 1 is a front view of my tube partly in section;

Fig. 2 is a sectional view of the tube;

Fig. 3 is a sectional detail view of the inflating manifold (at the left) and deflating manifold (at the right) and of the tire valve connected with the inflating manifold;

Fig. 4 is a sectional view of a modified tube;

Fig. 5 is a sectional view of another modification;

Fig. 6 is a fractional sectional view of a modified tube;

Fig. 7 is a fractional sectional view of another modification;

Fig. 8 is a view of a combined valve for both manifolds;

Fig. 9 is a modified valve in the inflating manifold;

Fig. 10 is a detail view of a modified valve for the deflating manifold;

Fig. 11 is a detail view of a modification;

Fig. 12 is an enlarged detail view of the valves shown in Fig. 11.

My inner tube as shown in Figs. 1, 2 and 3, consists of a plurality of individual elements or cells 1 having curved inner and outer sides and flat side walls 2, the latter being joined together in any suitable manner and may be cemented at 3. The side walls 2 preferably extend in radial directions although they may be inclined as shown in Fig. 6 in order to reduce their resistance to bending. The assembled tube is of a round shape corresponding to the shape of an ordinary inner tube and can be inserted in an ordinary tire casing.

For inflating the cells an auxiliary tube or manifold 4 is provided of a relatively small diameter extending along the inner periphery of the tube.

The manifold 4 is held in place by a flap 5 made of rubber or rubberized fabric and attached at the edges to the sides of the cells 1 as by cementing. An ordinary tire valve 6 is attached to the manifold 4 and has a valve plunger 7 inside of an ordinary type for admitting compressed air into the manifold. The latter is connected with every cell by one-way valves 8, the junction between the valves 8 and the wall of the cell being hermetically sealed as by cementing the manifold to the cells. The valve 8 may be made as shown in Fig. 3 in the form of a metal nipple closed at the inner end and provided with a hole 9 at the side closed by a piece 10 of a rubber tubing. Compressed air in the manifold forces the tubing 10 out or away from the nipple, thereby passing into the cell. The tubing 10 closes the escape of the compressed air from the cell if the manifold is deflated.

A similar manifold 11 is placed at the side of the first or inflating manifold 4 under the flap 5 and is provided with a valve 12 with a plunger 7 inside. The air can be exhausted from the second manifold by manually depressing the plunger 7 if the latter is of an ordinary type used on inner tubes. The deflating manifold 11 is connected with every cell 1 by deflating valves 13 which are opened by the air pressure in the cells, allowing the air to escape if the valve 12 is opened.

For inflating the tire, the valve 6 is connected with a source of compressed air, the latter passing through the valves 8 into the cells and, through the valves 13, into the manifold 11. For deflating the tire, the valve 12 is opened, allowing the air to escape from the cells 1 through the valves 13, the air passing through holes 9' and deflecting the inner rubber tubes 10'.

It should be noted that the tire does not become fully deflated if one of the cells becomes punctured. The air will escape from the punctured cell and from the inflating manifold but the other cells will retain their pressure, being separated from the manifold by the valves 8. The adjacent cells will distend, closing in on the deflated cell and establishing a substantially uniform pressure in the tire casing so that no adverse effect will be produced on the steering of the vehicle. It is evident that the tire will remain reasonably inflated even if several cells are punctured, provided the damaged cells are separated from each other by the inflated cells.

The cells 1 may be enclosed in an envelope 14, Fig. 4, made of canvas or similar material, the ends of the envelope overlapping each other at the inner periphery, in which case the flap 5 may not be needed.

The manifolds 4 and 11 may be placed inside the cells 1 as shown in Fig. 5, passing through the walls 2 and cemented to them so as to make the junction air-tight.

The cells 15 may be provided with inclined walls 16 as shown in Fig. 6, the walls slanting backward in direction of rotation for reducing resistance to their flexure.

A modified construction of the cell valves is shown in Figs. 9 and 10. The inflating valve, Fig. 9, consists of a metal tube 17 inserted into the manifold 18, the latter having openings 19 normally closed by the tube which has openings 20 not in register with the openings 19. The air pressure from inside of the manifold tends to raise the rubber wall of the manifold, admitting the air into the cell, the reverse flow being prevented by the rubber pressing against the tube 17. The deflating valve consists of a metal tube 21 placed over the deflating manifold 11, the latter having a hole 22 out of register with holes 23 in the tube. The air can deflect the rubber tubing of the manifold inward from the metal tube but the reverse air flow is stopped by the pressure of the rubber against the tube.

A modified combination valve is shown in Fig. 8, consisting of the inflating and deflating valves 24 and 25 respectively, joined together so that they can be inserted as a single unit into a corresponding hole in the tire rim. This construction is especially suitable when my valves must be fitted in a tire rim of an ordinary construction. The inner ends 26 and 27 may be made to fit into the ends of the respective manifolds, their other ends being then closed, although, of course, any other suitable means for attaching the valves to the manifolds may be employed.

A modified inner tube is shown in Fig. 7. It consists of cells 28, each provided with an ordinary tire valve 6, there being as many valves passing through the tire rim to the outside as there are cells.

Another modification is shown in Figs. 11 and 12. Every pair of the valves 8 and 13 are joined together and are held in a conical enclosure 29 tightly fitted in a cell 30, the latter being provided with a reinforced nipple 31 for the valve cone 29. The tubes 4 and 11 are held in an enclosure formed of a flap 5 and a cover 32. The enclosure is mounted on the rim first and then the tube is placed over the enclosure, fitting the nipples 31 over the valve cones 29. With this arrangement, the assembly is simplified, and, moreover, it is possible to individually replace the cells 30.

It is understood that my inner tube may be further modified without departing from the spirit of my invention, as set forth in the appended claims.

I claim as my invention:

1. An inner tube for a pneumatic tire comprising a plurality of cells made of an elastic material and joined together to form an annular body, an inflating and a deflating manifold, means to support the manifolds on a rim of a wheel, means to admit air into the inflating manifold, means to exhaust air from the deflating manifold, a plurality of valves on the inflating manifold adapted to exhaust air from the inflating manifold, a plurality of intake valves on the deflating manifold, every intake valve being joined with the corresponding exhaust valve, a conical enclosure for every pair of said valves, the cells of the tube having openings for the conical enclosure, and reinforcing nipples around the opening in the cells tightly fitting over the conical enclosure, thereby supporting the tube on the manifolds.

2. An inner tube for a pneumatic tire comprising a plurality of cells made of an elastic material and joined together to form an annular body, an inflating and a deflating manifold, means to support the manifolds on a rim of a wheel, means to admit air into the inflating manifold, means to exhaust air from the deflating manifold, a plurality of valves on the inflating manifold adapted to exhaust air from the inflating manifold, a plurality of intake valves on the deflating manifold, every intake valve being joined with the corresponding exhaust valve, a conical member enclosing every pair of the valves, the wall of every cell having an inwardly extending conical nipple tightly engaging the conical member, and an outer strip holding the manifold against the inner sides of the cells.

3. An inner tube for a pneumatic tire comprising a plurality of cells made of an elastic material and joined together to form an annular body, an inflating and a deflating manifold, means to support the manifolds on a rim of a wheel, means to admit air into the inflating manifold, means to exhaust air from the deflating manifold, a plurality of valves on the inflating manifold adapted to exhaust air from the inflating manifold, a plurality of intake valves on the deflating manifold, every intake valve being joined with the corresponding exhaust valve, and means to tightly and slidably fit the cells over the joined valves.

ISAIAH FELDMAN.